United States Patent Office 3,586,712
Patented June 22, 1971

3,586,712
ATTRACTANT FOR PINK BOLLWORM MOTHS
Nathan Green, Silver Spring, Md., and John C. Keller, Tempe, Ariz., assignors to the United States of America as represented by the Secretary of Agriculture
No Drawing. Filed Dec. 2, 1968, Ser. No. 780,596
Int. Cl. C07c 69/14
U.S. Cl. 260—488                                  1 Claim

ABSTRACT OF THE DISCLOSURE

A new organic ester, cis-7-hexadecen-1-ol acetate, also known as "hexalure" is synthesized and found to be a powerful attractant under field conditions for adult male pink bollworm moths.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to a novel, highly effective attractant for pink bollworm moths. More specifically it relates to the preparation and properties of a new organic ester, cis-7-hexadecen-1-ol acetate, a powerful attractant for adult male pink bollworm moths, *Pectinophora gossypiella* (Saunders).

The compound of this invention, commonly called "hexalure," is at present the only synthetic compound known to attract pink bollworm moths under field conditions. Consequently, in addition to being an indispensible tool in the study of the habits of the pink bollworm moth, it is also extremely useful in the detection and control of this insect pest.

The pink bollworm larvae feed on the buds, flowers and bolls of the cotton plant, and, because of their widespread distribution, voracious appetite, and enormous population cause severe economic losses to cotton growers. Cis-7-hexadecen-1-ol acetate can aid the scientist and the farmer in obtaining vital information about this destructive moth. This ester, deployed in suitable traps, is useful for studying pink bollworm flight patterns, detecting new infestations, delineating infested areas and estimating population densities. This information is extremely valuable to the cotton grower as a guide in planning subsequent spraying and other control operations. Thus, the widespread broadcasting of toxic insecticides and the resulting contamination of the surrounding areas can be greatly minimized.

Cis-7-hexadecen-1-ol acetate can be used in several different ways to capture, sterilize or kill this obnoxious insect. Hexalure can be used in conjunction with suitable maze traps, funnel traps, electric light traps, electroduction grids, or sterilizing gamma ray sources. It may be mixed with adhesive materials such as that used to coat fly paper or with chemical toxicants, fumigants or insect sex sterilants.

Hexalure can also be used to disrupt the pink bollworm mating pattern by a procedure known as "male confusion technique" as described by Gaston et al., Nature 213, 155 (1967).

Since the pink bollworm damages cotton plants only during its larval stage of growth and since the compound of this invention attracts only the adult male insect, the use of hexalure will not cause an immediate reduction in the amount of damage caused by pink bollworms. However, hexalure will eliminate a significant proportion of adult males thereby greatly limiting the production of viable eggs. Consequently, there will be fewer larvae available in subsequent years and damage to cotton crops by this insect will be substantially reduced.

In order to combat the pink bollworm and prevent heavy crop and monetary losses, the cotton grower is forced to use large quantities of insecticides which are expensive and costly to apply. Insecticides are also extremely toxic to birds, fish and other domestic and wild animals and constitute a grave danger to field workers, pest control operators and the ultimate consumer and when used excessively contaminate the entire environment.

Use of the nontoxic attractant of this invention would greatly alleviate some of these problems of toxicity and contamination.

Hexalure, cis-7-hexadecen-1-ol acetate, is unique in that it is the only synthetic compound that attacks pink bollworm moths under field conditions. Even propylure, the sex pheromone first isolated from virgin pink bollworm moths and later synthesized (Science 152, 1516–17, 1966) failed to attract the male insect in the field. The only substance now used to attract pink bollworm moths is a crude methylene chloride extract of the terminal abdominal segments of virgin female moths.

Cis-7-hexadecen-1-ol acetate (hexalure) is greatly superior to the above crude extract for several reasons. The extract is very difficult to prepare, requiring a facility for rearing pink bollworms, separation of the sexes, clipping of the abdominal segments and preparation of the extract. The product is a crude mixture, variable in potency, of questionable stability and subject to microbial decomposition.

The synthetic ester, hexalure, on the other hand, is a pure stable compound easily prepared at moderate cost in any desired quantity, by anyone skilled in the art of organic synthesis. Although hexalure may be somewhat less potent than the natural sex lure on an equal weight basis, this seeming disadvantage is overshadowed by the ease with which large quantities of the acetate can be prepared.

An object of this invention is to provide an attractant that will draw adult male pink bollworm moths to baited traps.

Another object of this invention is to provide a novel means of studying pink bollworm flight patterns, detecting new infestations of the insect, delineating the insect infested areas and estimating the bollworm population densities.

A further object of this invention is to synthesize a new organic ester, cis-7-hexadecen-1-ol acetate, which will, under field conditions, attract adult male pink bollworm moths.

In general, according to the present invention, a new organic ester, cis-7-hexadecen-1-ol acetate, also known as "hexalure," is synthesized and found to be a powerful attractant for adult male pink bollworm moths, *Pectinophora gossypiella* (Saunders).

Cis-7-hexadecen-1-ol acetate (I) is the acetic acid ester of cis-7-hexadecen-1-ol and has the following formula:

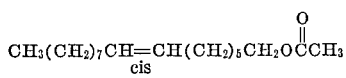

$$CH_3(CH_2)_7CH\underset{cis}{=\!=}CH(CH_2)_5CH_2O\overset{O}{\overset{\|}{C}}CH_3$$

It is a clear, oily feeling, slightly viscous colorless liquid with a mild pleasant odor reminiscent of the odor of freshly cut grass. It is insoluble in water but readily soluble in hexane, ethyl ether, acetone, benzene and other organic solvents. On the basis of its structure, it probably has a very low toxicity to mammals, birds, fish and insects.

Since the structure of I is relatively simple, the compound can be prepared by a number of synthetic routes. For the purposes of this invention procedures employed by Green, et al. (J. Medic. Chem. 10, 533, 1967) and Warthen (J. Medic. Chem. 11, 371, 1968) were used to prepare cis-7-hexadecen-1-ol acetate (I). The synthesis of one lot of the compound is described below.

2[(6-chlorohexyl)oxy]tetrahydropyran (II)

Dihydropyran (40 g.) was slowly dripped into a stirred mixture of 55 g. of 6-chloro-1-hexanol and 0.3 ml. of concentrated HCl, which was cooled to keep the temperature below 40°. After the mixture was stirred for 3 hrs. at 25°, 2 g. of NaHCO$_3$ was added and the mixture was stirred for 1 hr., filtered, and distilled to give 76.4 g. (87%) of II, B.P. 84–87° (0.13 mm.), $n_D^{25}$ 1.4599.

Infrared spectrum: The broad OH peak of the 6-chloro-1-hexanol at 3480 cm.$^{-1}$ was virtually absent.

Analysis.—Calcd. for C$_{11}$H$_{21}$ClO$_2$ (percent): C, 59.85; H, 9.59; Cl, 16.06. Found (percent): C, 60.32; H, 9.55; Cl, 15.70.

2-(7-octynyloxy)tetrahydropyran (III)

A solution of 115 g. (0.52 mole) of II in 50 ml. of dimethylsulfoxide was slowly added, over 1 hr., to a stirred slurry of 53.4 g. of lithium acetylideethylenediamine complex in 200 ml. of dry dimethyl sulfoxide cooled to 15°. The mixture was allowed to come to room temperature and was then stirred overnight. It was then diluted with 400 ml. of ice and water, the layers were separated, and the aqueous phase was extracted three times with ether. The combined organic phase was washed four times with saturated NaCl solution and distilled to give 96.1 g. (88.2%) of III, B.P. 83–84° C. (0.3 mm.), $n_D^{25}$ 1.4590.

Gas chromatographic analysis: A 5 ft. x ⅛ in. column containing 5% Carbowax TPA on 60–80 mesh basewashed Chromosorb W was used. The carrier gas was nitrogen, flow rate 20–25 ml./min. and the column temperature 150° C. The result was a single peak with a retention time of 4.8 minutes.

Infrared spectrum: The significant absorptions included four sharp peaks in the 1150–1000$^{-1}$ cm. region (tetrahydropyranyl) and a terminal C:CH peak at 3300 cm.$^{-1}$.

Analysis.—Calcd. for C$_{13}$H$_{22}$O$_2$ (percent): C, 74.24; H, 10.55. Found (percent): C, 74.40; H, 10.60.

2-(7-hexadecynyloxy)tetrahydropyran (IV)

A mixture of 21.0 g. III, 1.95 g. lithium amide and 100 ml. of dry, purified dioxane was stirred and refluxed 6 hours, 19.3 g. of n-octyl bromide was added and the refluxing and stirring continued for 20 hours more. The mixture was chilled in an icebath, diluted with 200 ml. of water and the layers separated. The aqueous layer was extracted 3 times with small portions of ether. The combined organic phase was washed twice with water and twice with saturated brine; the solvents were evaporated and the residue distilled to give 12.95 g. (40%) of IV which boiled at 140–145° C. (.001 mm.), $n_D^{25}$ 1.4636.

The infrared spectrum showed practically no absorption at 3300 cm.$^{-1}$.

Gas chromatography: When the column described above was operated at 175° the distilled product gave a single peak with an elution time of 15.4 minutes.

Analysis.—Calcd. for C$_{18}$H$_{32}$O$_2$ (percent): C, 77.09; H, 11.88. Found (percent): C, 78.36; H, 11.99.

7-hexadecyn-1-ol acetate (V)

A mixture of 6.85 g. IV, 20 ml. glacial acetic acid and 7 ml. acetyl chloride was refluxed 5 hrs. The excess reagents were evaporated in vacuo and the residue distilled to give a quantitative yield of V, B.P. 117–21° (0.001 mm.), $n_D^{25}$ 1.4532.

Gas chromatography: The product gave a single peak with a retention time of 7.9 minutes at a column temperature of 162° C.

Analysis.—Calcd. for C$_{18}$H$_{32}$O$_2$ (percent): C, 77.09; H, 11.50. Found (percent): C, 76.80; H, 11.29.

Cis-7-hexadecen-1-ol acetate (I)

1.4 g. (0.005 mole) of V was dissolved in 20 ml. absolute ethanol, 0.12 g. of 5% palladium on CaCO$_3$ was added along with one drop of quinoline to "poison" the catalyst. The compound was hydrogenated at 27° C. until one mole of hydrogen had been absorbed and the reaction came to a stop (volume of H$_2$ absorbed was 118 ml.; theoretical amount=125 ml.). The solution was filtered, the solvent removed in vacuo and the residue dissolved in pentane. This solution was washed with dilute HCl and then with water, the solvent was evaporated and the product was distilled, B.P. 100–104° C. (0.001 mm.), $n_D^{25}$ 1.4484.

Gas chromatography: At a column temperature of 162° the distilled product gave a single peak with an elution time of 5.0 minutes.

Infrared spectrum: There were absorption peaks at 2850–2940 (C—H), 1740 and 1235 cm.$^{-1}$ (primary acetate). A small peak at 965 cm.$^{-1}$ indicated the presence of a few percent of the trans isomer of I.

Analysis.—Calcd. for C$_{18}$H$_{34}$O$_2$ (percent): C, 76.54; H, 12.13. Found (percent): C, 76.27; H, 12.19.

The efficacy of cis-7-hexadecen-1-ol acetate as an attractant for pink bollworm moths was evaluated in laboratory and field tests. In a preliminary test, a trap baited with 6 mg. of the compound of this invention caught, during 7 days, 51% of the number of male moths caught by the natural sex attractant contained in a crude methylene chloride extract of 25 virgin females. Over a 14-day period the synthetic/natural catch ratio was 42%.

Extensive field tests were conducted to compare the attractiveness to male pink bollworm moths of cis-7-hexadecen-1-ol acetate, natural lure (attractant in crude methylene chloride extract of virgin females), and live virgin female moths. The traps consisted of 9 oz. plastic cups each of which was fitted with a wire or string across its top diameter to which was attached several folds of absorbant paper 1″ x 1″ impregnated with various dosages of an attractant. Other traps were fitted with small cages containing live virgin female moths. The cups were then filled with detergent and water for a trapping medium and the traps were suspended from ¼″ steel rods in a cotton field. Counts of the captured moths were made at 2 to 4 day intervals for 14 days. As shown in the following tabulation cis-7-hexadecen-1-ol acetate was initially about equal to 50 female equivalents of natural lure but after 5 or 7 days the synthetic lure at all test dosages was superior to either natural lure or virgin females.

| Lure and dosage | No. of male moths caught at indicated days | | | | | | |
|---|---|---|---|---|---|---|---|
| | 1 | 3 | 5 | 7 | 9 | 11 | 14 |
| Field Test No. 1: | | | | | | | |
|   cis-7-hexadecen-1-ol acetate, 60 mg | 7 | 16 | —— | 21 | 33 | 32 | 19 |
|   Natural lure¹ 50 female equivalents | 0 | 22 | —— | 15 | 5 | 12 | 3 |
| Field Test No. 2: | | | | | | | |
|   cis-7-hexadecen-1-ol acetate: | | | | | | | |
|     1 mg | —— | 4 | 8 | .3 | .3 | 0 | 0 |
|     10 mg | 9 | 4.3 | 3 | 1.6 | 1.2 | 1.3 | 1 |
|     50 mg | 10 | 4 | 3 | 1.3 | 3.9 | 1.6 | 2 |
|     100 mg | 10 | 5.3 | 4.9 | 0.3 | 6.0 | 3.3 | 4 |
|   Natural lure¹: 50 female equivalents | 10 | 15.3 | 2 | 1.3 | 2 | 0.3 | 0 |
|   2 live virgin females | 2 | 2 | 3 | 0 | 0 | —— | —— |
|   5 live virgin females | 3 | 2 | 0 | 0 | 0 | —— | —— |

¹ Crude methylene chloride extract of virgin females.

We claim:
1. Cis-7-hexadecen-1-ol acetate.

References Cited

UNITED STATES PATENTS 3,072,526  1/1963  Butenandt et al. ----- 260—632
3,304,333  2/1967  Truscheit et al. ----- 260—488

OTHER REFERENCES

Jones et al., Sex Attractant of the Pink Bollworm Moth Science, vol. 152, 1960, pp. 1516–17.

LORRAINE A. WEINBERGER, Primary Examiner

V. GARNER, Assistant Examiner

U.S. Cl. X.R.

424—84